May 10, 1966  E. S. KARSTENS  3,250,503
HYDRAULIC LEVELING JACK
Filed May 25, 1964  2 Sheets-Sheet 1

INVENTOR.
EDWARD S. KARSTENS
BY John M. Nolan
ATTORNEY

May 10, 1966   E. S. KARSTENS   3,250,503
HYDRAULIC LEVELING JACK

Filed May 25, 1964   2 Sheets-Sheet 2

INVENTOR.
EDWARD S. KARSTENS
BY John M. Nolan
ATTORNEY

United States Patent Office 3,250,503
Patented May 10, 1966

3,250,503
HYDRAULIC LEVELING JACK
Edward S. Karstens, 1228½ Sturdevant St.,
Davenport, Iowa
Filed May 25, 1964, Ser. No. 370,129
9 Claims. (Cl. 248—23)

This invention relates to a hydraulic leveling jack and more particularly to a hydraulic machine leveling jack and the method of using one or more of said jacks to level heavy machinery.

Many types of heavy machines such as electric motors and generators, or heavy machine tools, must be substantially level to perform and wear properly. Some precision machine tools must be level within a micro-inch for proper operation.

Since most such machines are placed on relatively rough uneven floors and surfaces, they must be leveled before they are used. Heretofore, most leveling has been accomplished by means of wedge type jacks, the top and bottom of said jacks being substantially parallel. However, when the floor under the machine is uneven, as is generally the case, the top of the jack is not flush with the bottom of the machine, the contact between machine and jack being at one bearing point. The resulting high pressure at the bearing point and the vibration of the machine cause rapid wear at the bearing surface. This causes an out-of-level condition which necessitates frequent re-leveling of the machine.

The present invention overcomes this problem since the top and bottom surfaces of the jack are not necessarily parallel, being free to fit flush with both the floor and the bottom of the machine.

Generally such machines are fastened to the floor by means of anchor bolts imbedded in the floor. Present leveling means cannot be used directly over the anchor bolts. Thus, when the nuts or the anchor bolts are tightened, generating a downward force on the machine, the supporting force exerted by the leveling means is some distance away. The resulting moment arm creates additional undesirable stresses on the machine base.

The present invention overcomes this problem by providing a hole in the middle of the jack to accommodate the anchor bolt. Thus, the support is provided at the same point that the downward force is exerted and no rotational force is exerted on the machine base.

The present invention can also be converted to a permanent machine mounting by using a fluid grout as the hydraulic fluid, the grout solidifying to provide a permanent base.

Accordingly, an object of the present invention is to provide a hydraulic jack for leveling heavy machinery.

A further object of the present invention is to provide a hydraulic machine leveling jack with top and bottom surfaces that will fit flush against both the bottom of the machine and the floor.

Another object of the present invention is to provide a hydraulic machine leveling jack that will exert force at the same point as the machine anchor bolts.

Another object of the present invention is to provide a hydraulic machine leveling jack that will utilize almost any liquid as a hydraulic fluid, including a fluid grout that will solidify to provide a permanent mounting.

Another object of the present invention is to provide a hydraulic machine leveling jack of simple and rugged construction, which is easy and inexpensive to manufacture.

Another object of the present invention is to provide a hydraulic leveling jack that can be connected with other similar jacks in various combinations to provide a leveling system for one or more machines.

Still another object of the present invention is to provide a procedure whereby the said jacks are used to level heavy machinery.

The foregoing and other objects and advantages of the invention will appear more fully from a consideration of the drawings and detailed description which follow. It is to be expressly understood, however, that the drawings are for the purpose of illustration and are not to be construed as defining the limits of the invention.

Figure 1:
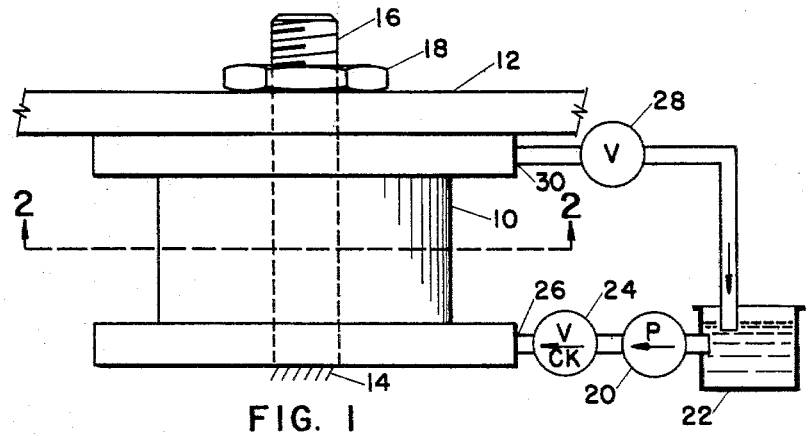
FIG. 1 is a front view of the hydraulic leveling jack in use, including a schematic representation of the hydraulic system.

Referring now to the drawings and in particular to FIG. 1, there is shown jack 10 between machine base 12 and floor 14. Anchor bolt 16 is imbedded in floor 14 and extends through jack 10 and machine base 12. Anchor nut 18 screws on anchor bolt 16. Fluid under pressure is supplied by pump 20 from reservoir 22 through check valve 24 to jack inlet 26. Pump 20 can be either manually operated or machine driven.

Should grease be used as the hydraulic fluid, pump 20 may be a standard grease gun, check valve 24 being a standard grease fitting. Fluid flow is regulated by valve 28, the inlet of which is in fluid communication with jack outlet 30, the outlet being in fluid communication with reservoir 22.

A plurality of machine leveling jacks can be operated by a single pressure source, the jacks being connected in series or in parallel or any combination thereof. Different size jacks can also be used under different parts of the machine base when the load is not uniformly distributed, larger jacks being used under the areas of the machine base that carry the greater load.

Figure 2:
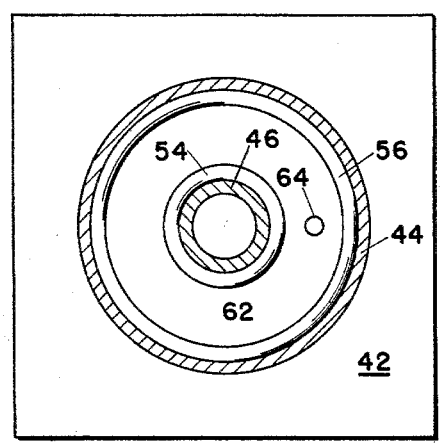
FIG. 2 is a cross-section of the jack viewed along line 2—2 of FIG. 1.
Figure 3:
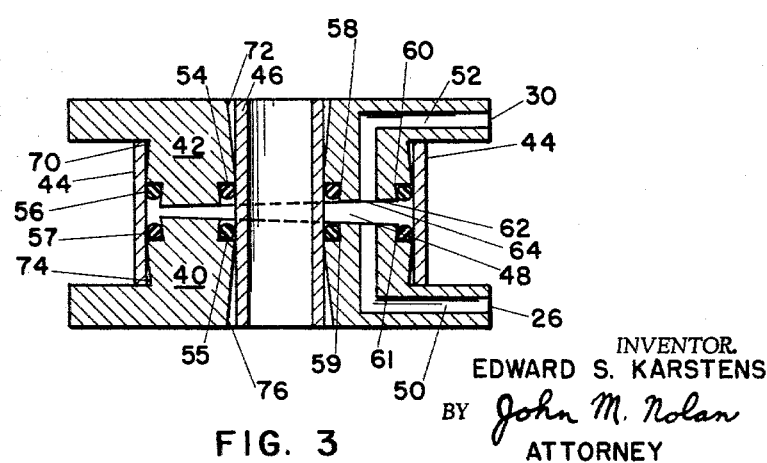
FIG. 3 is a vertical cross-section of the hydraulic leveling jack.

The structure of jack 10 is shown in FIGS. 2 and 3. Lower piston 40 and upper piston 42 move axially within cylinder 44 around sleeve 46. Lower piston 40, upper piston 42, cylinder 44 and sleeve 46 form a do-nut shaped hydraulic chamber 48. Conduit 50 in lower piston 40 connects inlet 26 to hydraulic chamber 48. Conduit 52 in upper piston 42 connects hydraulic chamber 48 to outlet 30.

Top circular inner gasket 54 fits in inner dovetail groove 58 which extends around the inside bottom perimeter of upper piston 42, sealing chamber 48 between sleeve 47 and upper piston 42. Bottom circular inner gasket 55 fits in inner dovetail groove 59 which extends around the inside top perimeter of lower piston 40, sealing chamber 48 between sleeve 46 and lower piston 40. Top circular outer gasket 56 fits in outer dovetail groove 60 which extends around the outside bottom perimeter of upper piston 42, sealing chamber 48 between cylinder 44 and upper piston 42. Bottom circular outer gasket 57 fits in outer dovetail groove 61 which extends around the outside top perimeter of lower piston 40, sealing chamber 48 between cylinder 44 and lower piston 40. The dovetail groove in which the gaskets fit and the fluid pressure in chamber 48 prevent the gaskets from losing their seals as the pistons move relative to cylinder 44 and sleeve 46.

Bottom face 62 of upper piston 42 is tapered so that chamber 48 is widest at inlet 64 of conduit 52, preventing air pockets from forming in chamber 48.

Outer piston surface 70 of upper piston 42 is tapered inward from the lower outside perimeter. Inner piston surface 72 of upper piston 42 is tapered in the same degree from the lower inside perimeter. Similarly, outer piston surface 74 of lower piston 40 is tapered inward from the upper outside perimeter and inner piston surface 76 of lower piston 40 is tapered outward from the upper inside perimeter. The tapered piston surfaces allow both pistons to cock in relation to sleeve 46 and cylinder 44. Thus, it is not necessary that machine base 12 which rests on upper piston 42 be parallel to floor 14 on which lower piston 40 rests.

Figure 4:
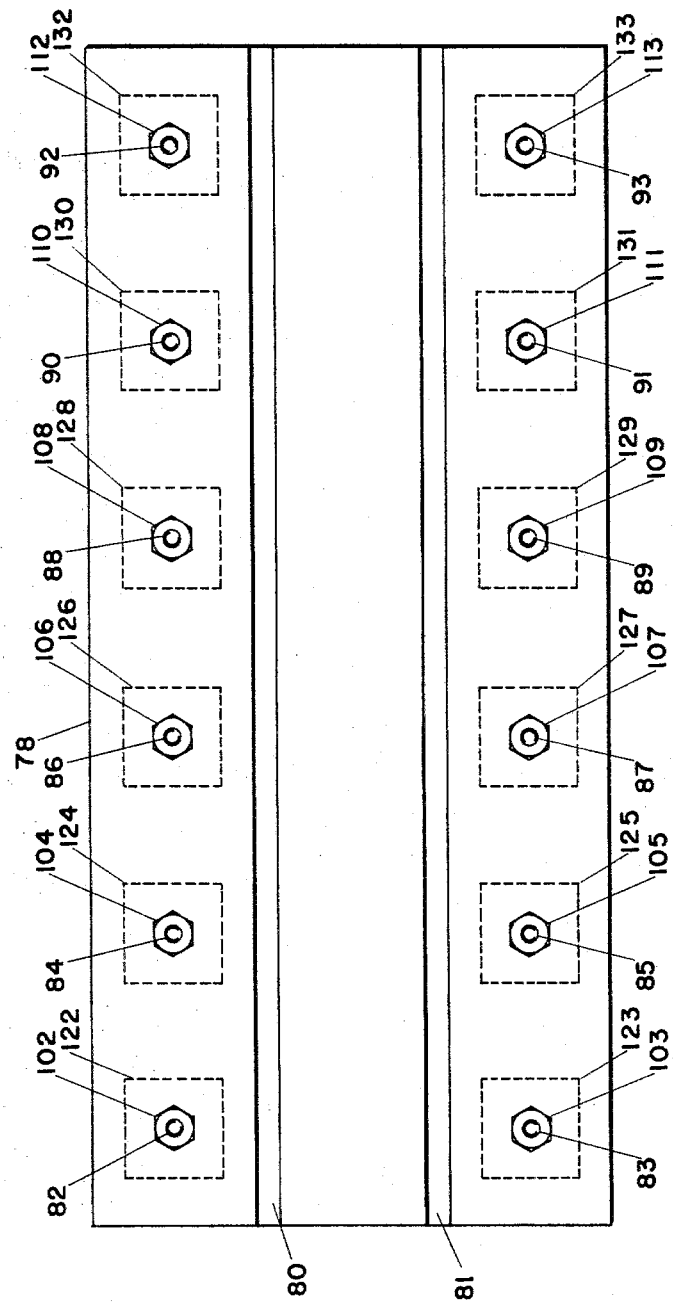
FIG. 4 is a top view of a typical machine bed showing the location of the jacks for purposes of leveling the machine.

Referring now to FIG. 4, there is shown a typical machine base 78 having parallel ways 80 and 81. Machine base 78 is anchored to the floor by means of twelve anchor bolts, 82, 83, 84, 85, 86, 87, 88, 89, 90, 91, 92 and 93 and their respective anchor nuts, 102, 103, 104, 105, 106, 107, 108, 109, 110, 111, 112 and 113. Between the floor and machine base 78, around the respective anchor bolts are leveling jacks 122, 123, 124, 125, 126, 127, 128, 129, 130, 131, 132 and 133.

To level such a machine, using the hydraulic leveling jacks, two opposed leveling jacks on each side are selected which will bear the load most uniformly with a minimum stress on the machine. Generally in a machine base substantially uniform throughout its length the jacks selected would be as near as possible to the one-quarter and three-quarter marks along the length of the machine. On the machine base 78 illustrated, in FIG. 4, leveling jacks 124, 125, 130 and 131 around anchor bolts 84, 85, 90 and 91, respectively, would be selected.

Next, four micro-levels would be placed on ways 80 and 81, one being placed on way 80 between anchor bolt 84 and anchor bolt 90, the second on way 81 between anchor bolt 85 and anchor bolt 91, the third across ways 80 and 81 between anchor bolts 84 and 85 and the fourth across ways 80 and 81 between anchor bolts 90 and 91. By adjusting leveling jacks 124, 125, 130 and 131 and their respective anchor nuts 104, 105, 110 and 111, the four points adjacent to leveling jacks 124, 125, 130 and 131 are leveled, giving four bench marks.

Next, keeping the micro-level across ways 80 and 81 between anchor bolts 84 and 85 in the same position, one micro-level is moved across ways 80 and 81 at the end of machine base 78 near leveling jacks 122 and 123, and the other two micro-levels are placed on ways 80 and 81, respectively, between the other two levels.

By raising leveling jacks 122 and 123 and adjusting anchor nuts 102 and 103, the end of machine base 78 is leveled relative to the bench marks.

Next the micro-levels are moved to the opposite end of the machine base 78, one micro-level being placed across ways 80 and 81 between the bench marks adjacent to anchor bolts 90 and 91, a second micro-level being placed across ways 80 and 81 between anchor bolts 92 and 93, and the third and fourth micro-levels being laid along ways 80 and 81 between anchor bolts 90 and 92 and also between bolts 91 and 93, respectively. By raising leveling jacks 132 and 133, and adjusting anchor nuts 112 and 113, this end of the machine is made level relative to the bench marks.

By moving the level across ways 80 and 81 between anchor bolts 92 and 93 to a position between anchor bolts 88 and 89, and sliding the levels on ways 80 and 81 to a position between anchor bolts 88 and 90 and between anchor bolts 89 and 91, respectively, and by similarly adjusting jacks 128 and 129 and anchor nuts 108 and 109, this area of the machine is also made level relative to the bench marks. Again moving the levels, the above procedure is repeated for jacks 126 and 127, and anchor nuts 106 and 107, bringing this area of the machine level relative to the bench marks.

The machine base 78 is now roughly level. By recalibrating the micro-levels, the following the above procedure to recheck the level of machine base 78, adjusting the jacks and anchor nuts where necessary, the machine base 78 can be easily and adequately leveled.

While the leveling jack as shown in the drawings is of the construction shown and described, it is understood that the instant invention is not limited to any particular form of construction. Changes and modifications of the novel leveling jack may be made by those skilled in the art without departing from the scope of the instant invention. In the preceding detailed descripiton certain vertical and horizontal positions of the jack were used to illustrate the jack. The use of these positions should not be considered as limiting the scope of the invention.

Moreover, the method of using the leveling jacks is more completely understood by describing its use with a specific type machine base. It is expressly understood that the machine leveling jack may be used in different combinations with various types of machines, and that the method of using said jacks to level a machine is not restricted to any specific type of machine.

I claim:

1. A hydraulic leveling jack comprising a cylinder uniform throughout its length and closed at one end, a piston having substantially the same diameter as said cylinder forming a shoulder at one end, the other end slidably inserted in said cylinder, said piston tapering to a smaller diameter away from said inserted end, an axial bore through said piston and an axial bore through the closed end of said cylinder, a sleeve uniform in diameter throughout its length mounted in the piston bore and the bore through the closed end of the cylinder, said piston bore tapering to a larger diameter away from the inserted end, said sleeve, piston and cylinder defining a chamber, and conduit means for supplying fluid pressure to said chamber.

2. A hydraulic jack comprising a cylinder uniform throughout its length open at both ends, two pistons, each having a shoulder larger than said cylinder around the perimeter at one end, the other ends being slidably inserted into opposed ends of said cylinder, an axial bore through said pistons, a sleeve uniform in inside and outside diameter throughout its length, slidably mounted in said bore, said pistons, cylinder and sleeve forming a chamber, sealing means between said pistons and said cylinder and sleeve, a fluid pressure source, and conduit means for supplying said fluid pressure to said chamber.

3. A hydraulic jack comprising a cylinder uniform throughout its length open at both ends, two pistons, each having a shoulder larger than said cylinder around the perimeter at one end, the other ends being slidably inserted into opposed ends of said cylinder, said pistons having a diameter slightly less than the diameter of said cylinder, the total insertable distance being less than the length of said cylinder, an axial bore through said pistons, a sleeve uniform in inside and outside diameter throughout its length, slidably mounted in said bore, said sleeve being slightly longer than the combined axial lengths of said piston, said pistons, cylinder and sleeve forming a chamber, a fluid pressure source and conduit means for supplying said fluid pressure to said chamber.

4. A hydraulic leveling jack comprising a cylinder uniform throughout its length open at both ends, two pistons, each having a shoulder larger than said cylinder around the perimeter at one end, the other ends being slidably inserted into opposed ends of said cylinder, said pistons having a diameter slightly less than the diameter of said cylinder, the pistons tapering to a smaller diameter away from said inserted end, an axial bore through said pistons, said bore tapering to a larger diameter away from the inserted end of each piston, a sleeve uniform in inside and outside diameter throughout its length, said outside diameter being slightly less than the smallest diameter of said bore, said pistons, cylinder and sleeve forming a chamber, sealing means between said pistons and said cylinder and sleeve, a fluid pressure source, inlet and outlet conduit means in one or more of said pistons for supplying and removing fluid under pressure to and from said chamber.

5. A hydraulic leveling jack comprising a cylinder uniform throughout its length open at both ends, two pistons each having a shoulder larger than said cylinder around the perimeter at one end, the other ends being slidably inserted into opposed ends of said cylinder, said pistons having a diameter slightly less than the diameter of said cylinder, the total insertable distance being less than the length of said cylinder, the pistons tapering to a smaller diameter away from said inserted end, an axial bore through said pistons, said bore tapering to a larger diameter away from the inserted end of each piston, a sleeve uniform in inside and outside diameter throughout its length, said outside diameter being slightly less than the smallest diameter of said bore, said sleeve being longer than the combined axial lengths of said piston, one or both of said pistons having a beveled face, said pistons, cylinder and sleeve defining a do-nut shaped chamber varying in depth, sealing means between said pistons and said cylinder and sleeve, a fluid pressure source, inlet conduit means in one of said pistons for supplying said fluid under pressure to said chamber and outlet conduit means in the other piston for removing said fluid under pressure from said chamber, said outlet conduit opening into said chamber at its deepest point, and valve means for controlling the flow of fluid to and from said chamber.

6. A hydraulic leveling jack comprising a cylinder uniform throughout its length open at both ends, two pistons, each having a shoulder larger than said cylinder around the perimeter at one end, the other ends being slidably inserted into opposed ends of said cylinder, said pistons having a diameter slightly less than the diameter of said cylinder, the total insertable distance being less than the length of said cylinder, the pistons tapering to a smaller diameter away from said inserted end, an axial bore through said pistons, said bore tapering to a larger diameter away from the inserted end of each piston, a sleeve uniform in inside and outside diameter throughout its length, said outside diameter being slightly less than the smallest diameter of said bore, said sleeve being slightly longer than the combined axial length of said pistons, said pistons, cylinder and sleeve forming a chamber, said pistons defining dovetailed cuts around the outside perimeters and the bore perimeters of the inserted ends, sealing means between said pistons and said cylinder and sleeve located in said dovetailed cuts, a fluid pressure source, inlet and outlet conduit means in one or more of said pistons for supplying and removing fluid under pressure to and from said chamber, and valve means for controlling the flow of fluid to and from said chamber.

7. A hydraulic leveling jack comprising a cylinder uniform throughout its length open at both ends, two pistons, each having a shoulder larger than said cylinder around the perimeter at one end, the other ends being slidably inserted into opposed ends of said cylinder, said pistons having a diameter slightly less than the diameter of said cylinder, the total insertable distance being less than the length of said cylinder, the pistons tapering to a smaller diameter away from said inserted end, an axial bore through said pistons, said bore tapering to a larger diameter away from the inserted end of each piston, a sleeve uniform in inside and outside diameter throughout its length, said outside diameter being slightly less than the smallest diameter of said bore, said sleeve being slightly longer than the combined axial lengths of said pistons, one or both of said pistons having a beveled face, said pistons, cylinder and sleeve defining a do-nut shaped chamber varying in depth, said pistons defining dovetailed cuts around the outside perimeters and the bore perimeters of their inserted ends, sealing means between said pistons and said cylinder and sleeve located in said dovetailed cuts, a fluid pressure source, inlet conduit means in one of said pistons for supplying said fluid under pressure to said chamber and outlet conduit means in the other piston for removing said fluid under pressure from said chamber, said conduit opening into said chamber at its widest point, and valve means for controlling the flow of fluid to and from said chamber.

8. A hydraulic jack comprising: a cylinder uniform in diameter throughout its length; means mounted in the cylinder for closing the cylinder at one end; a piston having a frusto-conical portion coaxially inserted into the open end of said cylinder, the larger diameter of said frusto-conical portion being toward the closed end of the piston and substantially conforming to the cylinder, the piston being axially tiltable about its larger diameter relative to the cylinder axis a small number of degrees; and conduit means for supplying fluid pressure to the cylinder between the piston and the closed end.

9. The method of supporting heavy machinery in a level condition above a supporting surface including a plurality of upwardly projecting anchor bolts comprising: providing a plurality of annular shaped hydraulic jacks having an axial bore and substantially parallel top and bottom faces capable of tilting relative to each other; placing each hydraulic jack around an anchor bolt with the bolt extending through said axial bore, with the top face engaging the machine base and the bottom surface engaging the supporting surface; and selectively supplying fluid under pressure to said jacks to actuate said jacks in varying amounts until the machine base is horizontal.

References Cited by the Examiner

UNITED STATES PATENTS

| | | | |
|---|---|---|---|
| 1,590,830 | 6/1926 | Jewkes | 254—93 |
| 1,928,533 | 9/1933 | Goss | 254—93 |
| 2,917,953 | 12/1959 | Badali | 77—7 |
| 2,937,865 | 5/1960 | Patterson | 267—65 X |
| 2,985,443 | 5/1961 | Smith | 267—1 |

CLAUDE A. LE ROY, *Primary Examiner.*

J. PETO, *Assistant Examiner.*